US011943597B2

(12) United States Patent
Wen

(10) Patent No.: US 11,943,597 B2
(45) **Date of Patent: *Mar. 26, 2024**

(54) RECEIVER

(71) Applicant: SUZHOU SENSORFUN ELECTRONICS CO., LTD, Suzhou (CN)

(72) Inventor: Jianguang Wen, Suzhou (CN)

(73) Assignee: SUZHOU SENSORFUN ELECTRONICS CO., LTD, Suzhou (CN)

(*) Notice: Subject to any disclaimer, the term of this patent is extended or adjusted under 35 U.S.C. 154(b) by 288 days.

This patent is subject to a terminal disclaimer.

(21) Appl. No.: 17/429,360

(22) PCT Filed: Sep. 12, 2019

(86) PCT No.: PCT/CN2019/105590
§ 371 (c)(1),
(2) Date: Aug. 9, 2021

(87) PCT Pub. No.: WO2020/192033
PCT Pub. Date: Oct. 1, 2020

(65) Prior Publication Data

US 2022/0159383 A1 May 19, 2022

(30) Foreign Application Priority Data

Mar. 22, 2019 (CN) ......................... 201910222244.7

(51) Int. Cl.
*H04R 9/06* (2006.01)
*H04R 1/02* (2006.01)
(Continued)

(52) U.S. Cl.
CPC ............... *H04R 9/06* (2013.01); *H04R 1/025* (2013.01); *H04R 7/04* (2013.01); *H04R 7/18* (2013.01);
(Continued)

(58) Field of Classification Search
CPC ........ H04R 1/025; H04R 9/025; H04R 11/02; H04R 2400/11; H04R 25/00; H04R 7/04;
(Continued)

(56) References Cited

U.S. PATENT DOCUMENTS

2011/0116650 A1* 5/2011 Umetsu .................. H04R 9/045 381/86
2011/0200204 A1* 8/2011 Horigome .............. H04R 9/025 381/86
(Continued)

FOREIGN PATENT DOCUMENTS

CN 107197410 A 9/2017
CN 107404696 A 11/2017
(Continued)

OTHER PUBLICATIONS

CN207518849U(SUZHOUYICHUANACOUSTICS TECHNOLOGYCO.,LTD.)Jun. 1-10, 2019 2018(Jun. 19, 2018).*
(Continued)

*Primary Examiner* — Lun-See Lao
(74) *Attorney, Agent, or Firm* — EcoTech Law Group, P.C.

(57) ABSTRACT

A receiver is provided in the present invention. The receiver includes: a housing having a hollow inner cavity; a diaphragm mechanism disposed in the hollow inner cavity, partitioning the hollow inner cavity into a first cavity and a second cavity, and including a vibration plate; and an electromagnetic driving mechanism disposed in the hollow inner cavity and including a coil assembly and at least one
(Continued)

magnetic field generation member. Each magnetic field generation member is disposed in the first cavity or the second cavity, and the magnetic field generation member is close to a free end of the vibration plate. The coil assembly is disposed in the second cavity and includes a coil and a magnetic core. The coil and the vibration plate are placed in the same direction. The magnetic core is inserted in a hollow inner hole of the coil. A first end of the magnetic core extends out of the hollow inner hole of the coil and is fixed in the second cavity, and a second end of the magnetic core extends out of the hollow inner hole of the coil and serves as a support for the vibration plate. A periphery of the diaphragm mechanism is sealingly connected to an inner wall of the housing. Compared with the prior art, the receiver in the present invention reduces connection between movable parts, thereby simplifying the assembly process and reducing the manufacturing cost.

12 Claims, 4 Drawing Sheets

(51) Int. Cl.
*H04R 7/04* (2006.01)
*H04R 7/18* (2006.01)
*H04R 9/02* (2006.01)

(52) U.S. Cl.
CPC .......... *H04R 9/025* (2013.01); *H04R 2400/11* (2013.01)

(58) Field of Classification Search
CPC . H04R 7/18; H04R 9/06; H04R 1/028; H04R 1/24; H04R 17/00; H04R 2201/021; H04R 2205/024; H04R 2307/201; H04R 2400/07; H04R 2440/03; H04R 2440/05; H04R 2440/07; H04R 2499/11; H04R 2499/13; H04R 2499/15; H04R 3/14; H04R 31/003; H04R 5/02; H04R 7/045; H04R 7/06; H04R 7/10; H04R 7/12; H04R 7/20; H04R 9/066; H04R 1/021; H04R 1/08; H04R 1/26; H04R 1/2811; H04R 1/2834; H04R 2225/43; H04R 2307/029; H04R 25/48; H04R 25/60; H04R 25/604; H04R 25/65; H04R 3/04; H04R 5/027; H04R 7/08; H04R 7/22; H04R 9/045; H04R 9/08; G10H 1/32; H04N 5/642; G10K 11/006
USPC .......................................... 381/335, 312, 92
See application file for complete search history.

(56) References Cited

U.S. PATENT DOCUMENTS

2019/0104367 A1* 4/2019 Xu .......................... H04R 9/06
2022/0078568 A1* 3/2022 Wen ...................... H04R 13/02

FOREIGN PATENT DOCUMENTS

| | | | |
|---|---|---|---|
| CN | 206993371 | U | 2/2018 |
| CN | 207184799 | U | 4/2018 |
| CN | 207266288 | U | 4/2018 |
| CN | 207518849 | U | 6/2018 |
| KR | 20090059341 | A | 6/2009 |
| WO | 2017047187 | A1 | 3/2017 |
| WO | 2018148485 | A1 | 8/2018 |

OTHER PUBLICATIONS

International Search Report and Written Opinion received for International PCT Application No. PCT/CN2019/105590, dated Dec. 25, 2019, 7 pages including English translation of International Search Report.
Office Action from European Patent Office received for Application No. 19921196.2, dated Sep. 30, 2022, 9 Pages.
European Search Report received for EP No. 19921196.2 dated Feb. 2, 2022, 9 Pages.

* cited by examiner

RECEIVER

1. FIELD OF THE INVENTION

The present invention relates to the technical field of electro-acoustic conversion, and in particular to a receiver.

2. BACKGROUND TECHNIQUE

A receiver is also called a handset, which is an electroacoustic device that converts audio electrical signals into acoustical signals without sound leakage and is widely used in a communication terminal device such as a mobile phone, a fixed-line telephone, and a hearing aid to achieve audio output.

FIG. 1 shows a receiver in the prior art, including a shell 110, a diaphragm 120, and an electromagnetic driving mechanism. The diaphragm 120 is disposed within the shell 110 and partitions an inner cavity of the shell into a front cavity and a back cavity, and the electromagnetic driving mechanism is fixed in the back cavity. The electromagnetic driving mechanism includes a driving rod 130, a reed (or an armature) 140, two permanent magnets 150 and a coil 160. One end of the reed 140 is fixed to an inner wall surface of a side wall of the housing 110, and the other end is connected to the diaphragm 120 through the driving rod 130. The coil 160 is sleeved on the reed 140 and is close to a U-shaped arc transition portion of the reed 140. The two permanent magnets 150 are respectively located on upper and lower sides of the end of the reed 140 close to the driving rod 130 and are fixed to the inner wall surfaces of the housing 110.

Since the reed 140 and the diaphragm 120 need to be connected by using the driving rod 130 (or a driving plate) and the permanent magnets 150 are disposed in a ring-shaped iron in the receiver shown in FIG. 1, it is very difficult to assemble by adopting such a design so that the assembly efficiency is low. It is difficult to achieve automated production, which requires high skills for employees and has an unstable manufacturing process. As a result, assembly quality control may affect product reliability, and a high reworking rate even causes scrapping, which impedes reduction of manufacturing costs.

Therefore, it is necessary to provide an improved technical solution to overcome the above problems.

SUMMARY OF THE INVENTION

The present invention is intended to provide a receiver, which reduces connection between movable parts, thereby simplifying the assembly process and reducing the manufacturing cost.

According to one aspect of the present invention, a receiver provided in the present invention comprises: a housing, having a hollow inner cavity; a diaphragm mechanism disposed in the hollow inner cavity, partitioning the hollow inner cavity into a first cavity and a second cavity, and comprising a vibration plate comprising a free end being suspended in the hollow inner cavity and a fixed end; and an electromagnetic driving mechanism disposed in the hollow inner cavity and comprising a coil assembly and at least one magnetic field generation member. Each magnetic field generation member is disposed in the first cavity or the second cavity and is close to the free end of the vibration plate, the coil assembly is disposed in the second cavity and comprises a coil and a magnetic core. The coil and the vibration plate are placed in the same direction, the magnetic core is inserted in a hollow inner hole of the coil, a first end of the magnetic core extends out of the hollow inner hole of the coil and is fixed in the second cavity, and a second end of the magnetic core extends out of the hollow inner hole of the coil and serves as a support for the vibration plate. A periphery of the diaphragm mechanism is sealingly connected to an inner wall of the housing.

Further, the magnetic field generation member is configured to generate a fixed magnetic field; the coil assembly is configured to generate an alternating magnetic field after being energized; the vibration plate is made of a magnetic permeable material, and the alternating magnetic field generated by the coil assembly after being energized is introduced to the vibration plate; and the magnetic core supports the fixed end of the vibration plate.

Further, the housing comprises a cover plate and a hollow box with a top opening, wherein the hollow box comprises a bottom surface and a side wall, the cover plate covers the top opening of the hollow box, and the hollow box and the cover plate form the hollow inner cavity, and the diaphragm mechanism is disposed within the hollow box and partitions the hollow inner cavity into the first cavity close to the cover plate and the second cavity close to the bottom surface of the hollow box.

Further, the housing further includes a boss arranged on an inner wall surface of the side wall of the housing, and the boss is configured to support the diaphragm mechanism.

Further, a side of the diaphragm mechanism that is located at the free end of the vibration plate is supported by the boss; and a side of the diaphragm mechanism that is located at the fixed end of vibration plate is supported by the second end of the magnetic core.

Further, the magnetic core is an L-shaped magnetic core, the L-shaped magnetic core comprises a horizontal portion and a vertical portion forming an L-shaped structure, wherein the horizontal portion of the L-shaped magnetic core is inserted in the hollow inner hole of the coil, wherein one end of the horizontal portion of the L-shaped magnetic core extends out of the inner hole of the coil and is fixed in the second cavity, and the vertical portion of the L-shaped magnetic core extends out of the hollow inner hole of the coil and is connected to the fixed end of the vibration plate, and wherein one end of the horizontal portion of the L-shaped magnetic core is referred to as a first end of the L-shaped magnetic core, and the vertical portion of the L-shaped magnetic core is referred to as a second end of the L-shaped magnetic core.

Further, the vibration plate is an inverted L-shaped vibration plate, the inverted L-shaped vibration plate comprises a horizontal portion and a vertical portion forming an inverted L-shaped structure, wherein one end of the horizontal portion of the inverted L-shaped vibration plate is a free end of the inverted L-shaped vibration plate, the other end of the horizontal portion that is connected to the vertical portion is a fixed end of the inverted L-shaped vibration plate, and the vertical portion of the inverted L-shaped vibration plate is connected to the second end of the magnetic core.

Further, the electromagnetic driving mechanism comprises: a first magnetic field generation member, arranged within the first cavity, a required gap being reserved between the first magnetic field generation member and the free end of the vibration plate; and a second magnetic field generation member, arranged within the second cavity, a required gap being reserved between the first magnetic field generation member and the free end of the vibration plate, wherein the second magnetic field generation member and the coil assembly are arranged side by side, and the coil assembly is closer to the fixed end of the vibration plate than the second magnetic field generation member, wherein the required gap is 0.05-0.2 mm.

Further, the first magnetic field generation member is fixed to a top surface of the housing, and the first magnetic field generation member and the second magnetic field generation member are opposite to each other; and the electromagnetic driving mechanism further comprises a first magnetic permeable block and a second magnetic permeable block sequentially arranged between the second magnetic field generation member and a bottom surface of the housing, wherein the first magnetic permeable block and the second magnetic permeable block are arranged opposite to each other and are spaced apart from each other, the first end of the magnetic core extending out of the hollow inner hole of the coil is clamped between the first magnetic permeable block and the second magnetic permeable block.

Further, the diaphragm mechanism further comprises a fixed frame and a hinge, wherein the fixed frame is connected to the side wall of the housing and has an inner space formed through the fixed frame in a thickness direction of the fixed frame, and the hinge is configured to hinge the fixed end of the vibration plate to an inner side of the fixed frame and is disposed on the fixed frame, and a protrusion and a groove matching the hinge are respectively arranged on the fixed end of the vibration plate and the fixed frame.

Compared with the prior art, the vibration plate in the present invention is made of the magnetic permeable material, and the fixed end of the vibration plate is connected to the magnetic core of the coil assembly, so that the alternating current magnetic field generated by the coil after being energized enters the vibration plate and interacts with a direct current (DC) magnetic field to generate a driving force to push the vibration plate to vibrate and produce sound without additional driving rods and reeds, thereby reducing the connection between the movable parts, simplifying the assembly process, and reducing the manufacturing cost.

BRIEF DESCRIPTION OF THE DRAWINGS

To describe the technical solutions in the embodiments of this specification more clearly, the following briefly introduces the accompanying drawings required for describing the embodiments. Apparently, the accompanying drawings in the following description show merely some embodiments of this application, and a person of ordinary skill in the art may still derive other accompanying drawings from these accompanying drawings without creative efforts. In the drawings.

DETAILED DESCRIPTION OF THE INVENTION

To make the objectives, features, and advantages of the present invention more obvious and comprehensible, the present invention is further described in detail below with reference to the accompanying drawings and specific implementations.

The phrase "an embodiment", "one embodiment", or "embodiments" as used herein refers to a particular feature, structure, or characteristic that can be included in at least one implementation of the present invention. The "in an embodiment" appearing in different places throughout the specification does not necessarily refer to the same embodiment, or an independent embodiment or optional embodiment that is mutually exclusive with other embodiments. Unless otherwise specified, the terms "connection", "connecting", and "connected" in this specification that indicate electrical connection all indicate direct or indirect electrical connection.

Figure 2:
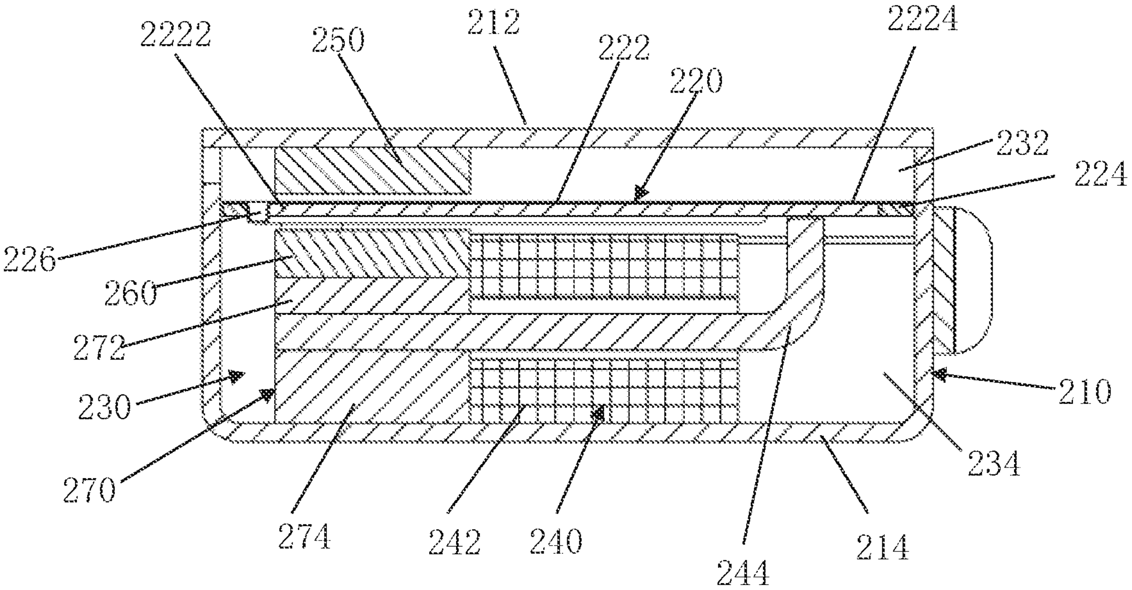
FIG. 2 is a first longitudinal schematic cross-sectional view of the receiver according to one embodiment of the present invention.
Figure 3:
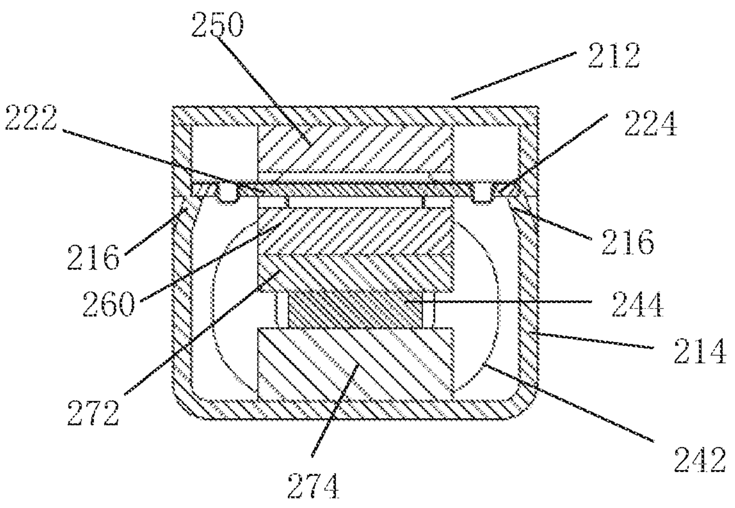
FIG. 3 is a second longitudinal schematic cross-sectional view of the receiver according to one embodiment of the present invention.

FIG. 2 is a first longitudinal schematic cross-sectional view of the receiver according to one embodiment of the present invention, and FIG. 3 is a second longitudinal schematic cross-sectional view of the receiver according to one embodiment of the present invention.

The receiver shown in FIG. 2 and FIG. 3 includes a housing 210, a diaphragm mechanism (or a diaphragm) 220, and an electromagnetic driving mechanism (not labelled).

The housing 210 has a hollow inner cavity 230. The diaphragm mechanism 220 is disposed in the hollow inner cavity 230 and partitions the hollow inner cavity 230 into a first cavity 232 and a second cavity 234. The diaphragm mechanism 220 includes a vibration plate 222. A fixed end 2224 of the vibration plate 222 is connected to an inner wall of the housing 210, and a free end (or a vibration end) 2222 of the vibration plate 222 is suspended in the hollow inner cavity 230.

In the specific embodiment shown in FIG. 2 and FIG. 3, the housing 210 includes a cover plate 212 and a hollow box 214 with a top opening. The hollow box 214 includes a bottom surface and a side wall. The cover plate 212 covers the top opening of the hollow box 214, and the hollow box 214 and the cover plate 212 form the hollow inner cavity 230. For example, the cover plate 212 and the hollow box 214 are fixedly connected by using adhesives or through electric welding. In a preferred embodiment, both the cover plate 212 and the hollow box 214 are both made of magnetic permeable materials.

In the specific embodiment shown in FIG. 2 and FIG. 3, the diaphragm mechanism 220 is disposed within the hollow box 214, and the diaphragm mechanism 220 partitions the hollow inner cavity 230 into the first cavity 232 close to the cover plate 212 and the second cavity 234 close to a bottom surface of the hollow box 214. A plurality of bosses 216 are provided on an inner wall surface of the side wall of the hollow box 214, and are configured to support the diaphragm mechanism 220.

The electromagnetic driving mechanism is disposed in the hollow inner cavity 230 and includes a coil assembly 240 and at least one magnetic field generation member 250, 260. The magnetic field generation member 250, 260 is respectively disposed in the first cavity 232 and the second cavity

234, and the magnetic field generation member 250, 260 is close to the free end 2222 of the vibration plate 222. The coil assembly 240 is disposed in the second cavity 234. The coil assembly 240 includes a coil 242 and a magnetic core 244. The coil 242 and the vibration plate 222 are placed in the same direction (that is, the coil 242 is placed horizontally or in parallel relative to the vibration plate 222). The magnetic core 244 is inserted in a hollow inner hole of the coil 242. A first end of the magnetic core 244 extends out of the hollow inner hole of the coil 242 and is fixed in the second cavity 234, and a second end of the magnetic core 244 extends out of the hollow inner hole of the coil 242 and serves as a support for the vibration plate 222. The magnetic core 244 is preferably an iron core.

In the specific embodiment shown in FIG. 2 and FIG. 3, the electromagnetic driving mechanism includes the first magnetic field generation member 250 disposed in the first cavity 232 and close to the free end 2222 of the vibration plate 222 and the second magnetic field generation member 260 disposed in the second cavity 234 and close to the free end 2222 of the vibration plate 222. The first magnetic field generation member 250 and the second magnetic field generation member 260 are opposite to each other. The first magnetic field generation member 250 is fixed to the cover plate 212 (or the top surface of the housing 210) and faces the free end 2222 of the vibration plate 222, and a required gap is reserved between the first magnetic field generation member 250 and the free end 2222 of the vibration plate 222, wherein the required gap is 0.05-0.2 mm. The second magnetic field generation member 260 is fixed to the bottom surface of the hollow box 214 (or a bottom surface of the housing 210) and faces the free end 2222 of the vibration plate 222, and a required gap is reserved between the second magnetic field generation member 260 and the free end of the vibration plate 222, wherein the required gap is 0.05-0.2 mm. The second magnetic field generation member 260 and the coil assembly 240 are arranged side by side, and the coil assembly 240 is closer to the fixed end 2224 of the vibration plate 222 than the second magnetic field generation member 260. In a preferred embodiment, the magnetic field generation member 250, 260 is a permanent magnet. In one embodiment, only the first magnetic field generation member 250 may be adopted, or only the second magnetic field generation member 260 may be adopted, as long as a fixed magnetic field (or the DC magnetic field) can be provided.

In the specific embodiment shown in FIG. 2 and FIG. 3, the electromagnetic driving mechanism further includes a magnetic permeable assembly 270. The magnetic permeable assembly 270 is located between the second magnetic field generation member 260 and the bottom surface of the hollow box 214. The magnetic permeable assembly 270 includes a first magnetic permeable block 272 and a second magnetic permeable block 274 sequentially arranged between the second magnetic field generation member 260 and the bottom surface of the hollow box 214. The first magnetic permeable block 272 and the second magnetic permeable block are arranged opposite to each other and are spaced apart from each other, and the first end of the magnetic core 244 extends out of the hollow inner hole of the coil 242 and is clamped between the first magnetic permeable block 272 and the second magnetic permeable block 274.

It should be particularly noted that in the specific embodiment shown in FIG. 2 and FIG. 3, the magnetic core 244 is an L-shaped magnetic core. The L-shaped magnetic core 244 includes a horizontal portion and a vertical portion forming an L-shaped structure. The horizontal portion of the L-shaped magnetic core 244 is inserted in the hollow inner hole of the coil 242. One end of the horizontal portion of the L-shaped magnetic core 244 extends out of the hollow inner hole of the coil 242 and is clamped between the first magnetic permeable block 272 and the second magnetic permeable block 274. The other end of the horizontal portion of the L-shaped magnetic core 244 is connected to the vertical portion of the L-shaped magnetic core 244. The vertical portion of the L-shaped magnetic core 244 extends out of the hollow inner hole of the coil 242 and is connected to the fixed end 2224 of the vibration plate 222. One end of the horizontal portion of the L-shaped magnetic core 244 is referred to as a first end of the L-shaped magnetic core 244, and the vertical portion of the L-shaped magnetic core 244 is referred to as a second end of the L-shaped magnetic core 244.

In the specific embodiment shown in FIG. 2 and FIG. 3, a side of the diaphragm mechanism 220 that is located at the free end 2222 of the vibration plate 222 is supported by the boss 216, and a side of the diaphragm mechanism 220 that is located at the fixed end 2224 of the vibration plate 222 is supported by the vertical portion of the L-shaped magnetic core 244. A periphery of the diaphragm mechanism 220 is fixed and sealingly connected with the inner wall of the housing 210 by adopting the adhesive.

Referring to FIG. 2 and FIG. 3, the diaphragm mechanism 220 further includes a fixed frame 224. The fixed frame 224 is connected to the inner side surfaces of the side walls of the hollow box 214 and has an inner space (not labelled) formed through the fixed frame in a thickness direction of the fixed frame 224. The fixed frame 224 is made of a non-magnetic permeable material that may be stainless steel, aluminum, or other non-magnetic permeable metal or non-metal materials. The fixed end 2224 of the vibration plate 222 is fixed to an inner side of the fixed frame 224, the free end 2222 of the vibration plate is suspended in the inner space of the fixed frame 224. A reserved gap 226 is formed between an outer side surface of the free end 2222 of the vibration plate 222 and an inner side surface of the fixed frame 224.

In the embodiment shown in FIG. 2 and FIG. 3, the vibration plate 222 and the fixed frame 224 are of a one-piece design, and a U-shaped reserved gap 226 is a slot formed on the one-piece design. In another embodiment, the diaphragm mechanism 220 further includes a hinge (not labelled), and the fixed end 2224 of the vibration plate 222 is hinged to the inner side of the fixed frame 224 through the hinge. The hinge is disposed on the fixed frame 224, and a protrusion and a groove matching the hinge are respectively arranged on the fixed end of the vibration plate 222 and the fixed frame 224.

The principle of the electromagnetic driving mechanism shown in FIG. 2 and FIG. 3 to drive the vibration plate 222 to vibrate is: when an alternating current is applied to the coil 242, the generated AC magnetic field enters the vibration plate 222 through the L-shaped magnetic core 244, so that the vibration plate 222 is polarized. Under the action of the fixed magnetic field (or the DC magnetic field) generated by the magnetic field generation member 250, 260, a driving force is generated to push the vibration plate 222 to vibrate repeatedly in the vertical direction, thereby driving a sounding diaphragm (not labelled) of the diaphragm mechanism 220 to blow the air to produce sound.

Figure 1:
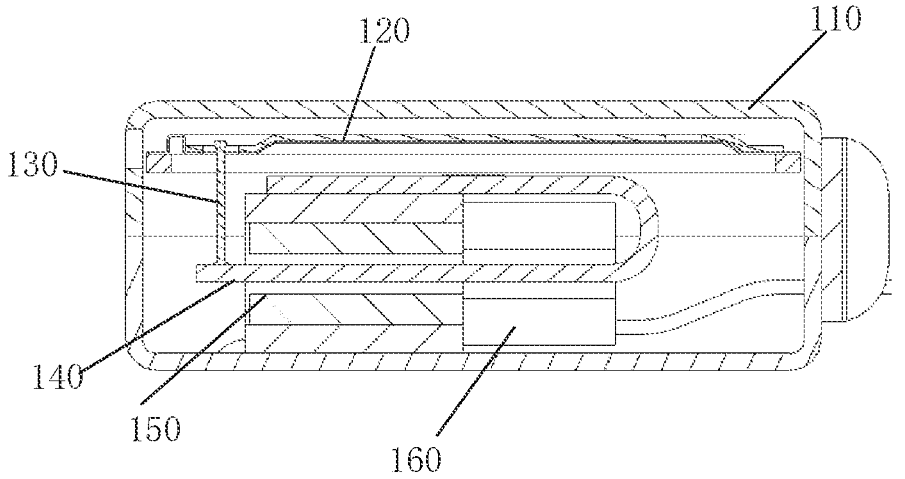
FIG. 1 is a schematic structural diagram of a receiver in the prior art.
Figure 4:
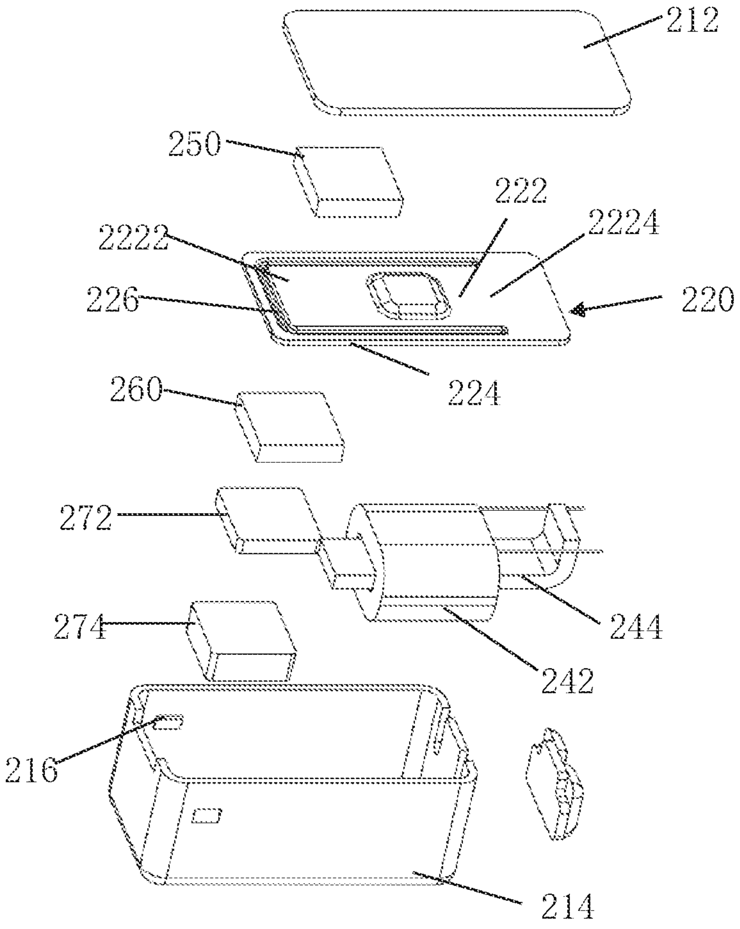
FIG. 4 is a schematic exploded view of the receiver shown in FIG. 2 and FIG. 3.

FIG. 4 is a schematic exploded view of the receiver shown in FIG. 2 and FIG. 3. Compared with FIG. 1, the assemblies inside the receiver shown in FIG. 4 are clearly structured, and the stacked design makes the assembly process simple, which is very suitable for automated production.

Figure 5:
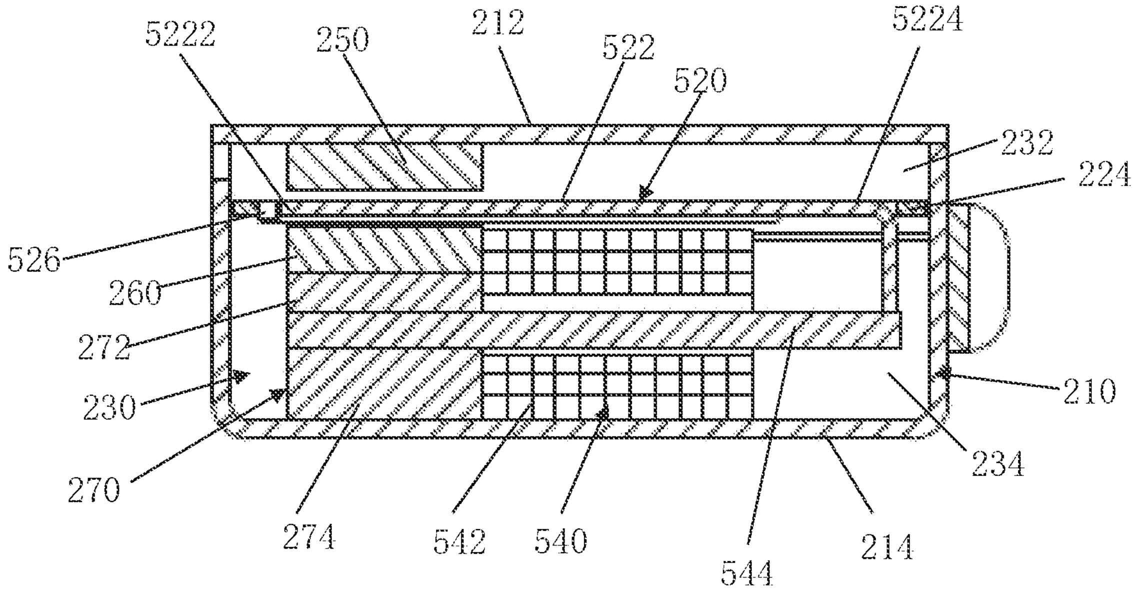
FIG. 5 is a longitudinal schematic cross-sectional view of the receiver according to another embodiment of the present invention.

FIG. 5 is a schematic longitudinal cross-sectional view of the receiver according to another embodiment of the present invention. The embodiment shown in FIG. 5 is an extension of the embodiment shown in FIG. 2. A main difference between the two is: the vibration plate 222 in FIG. 2 is a straight plate, and the magnetic core 244 is an L-shaped structure; the vibration plate 522 in FIG. 5 is an inverted L-shaped structure, and the magnetic core 544 is a straight rod or a straight plate.

As shown in FIG. 5, the coil assembly 540 is disposed in the second cavity 234. The coil assembly 540 includes a coil 542 and a magnetic core 544. The coil 542 and the vibration plate 522 are placed in the same direction (that is, the coil 542 is placed horizontally or in parallel relative to the vibration plate 522). The magnetic core 544 is a straight rod or a straight plate inserted in a hollow inner hole of the coil 542. A first end of the magnetic core 544 extends out of the hollow inner hole of the coil 542 and is clamped between the first magnetic permeable block 272 and the second magnetic permeable block 274, and a second end of the magnetic core 544 extends out of the hollow inner hole of the coil 242.

Figure 6:
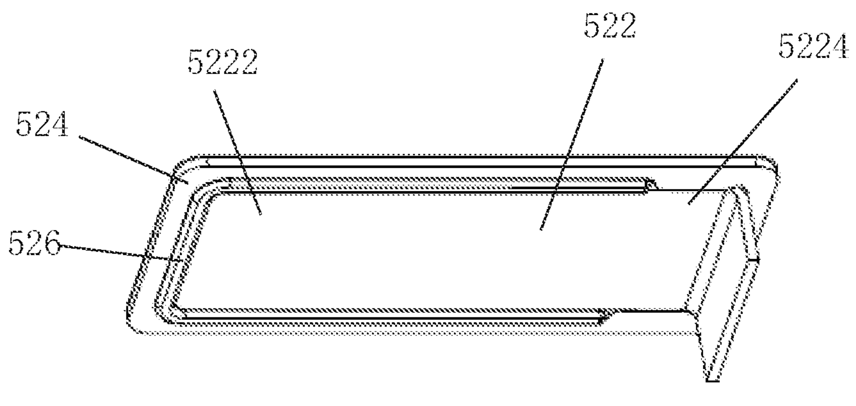
FIG. 6 is a structural implementation diagram of a diaphragm mechanism in FIG. 5 in one embodiment.

FIG. 6 is a structural implementation diagram of the diaphragm mechanism 520 in FIG. 5 in one embodiment. The diaphragm mechanism in FIG. 5 and FIG. 6 includes a fixed frame 524 and an inverted L-shaped vibration plate 522. The fixed frame 524 is connected to the inner side surfaces of the side walls of the hollow box 214 and has an inner space (not labelled) formed through the fixed frame in a thickness direction of the fixed frame 524. The inverted L-shaped vibration plate 522 includes a horizontal portion and a vertical portion forming an inverted L-shaped structure. One end of the horizontal portion of the inverted L-shaped vibration plate 522 is a free end 5222 of the vibration plate 522, the free end 5222 being suspended in the inner space of the fixed frame 524, and a reserved gap 526 is formed between an outer side surface of the free end 5222 and an inner side surface of the fixed frame 524. The other end of the horizontal portion that is connected to the vertical portion is a fixed end 5224 of the inverted L-shaped vibration plate 522, the fixed end 5224 being fixed to an inner side of the fixed frame 524, and the vertical portion of the inverted L-shaped vibration plate 522 is connected to a second end of the magnetic core 544 as a connecting end of the inverted L-shaped vibration plate 522.

In the specific embodiment shown in FIG. 5, a side of the diaphragm mechanism 520 that is located at the free end 5222 of the vibration plate 522 is supported by the boss 216, and a side of the diaphragm mechanism 520 that is located at the fixed end 5224 of the vibration plate 522 is supported by the second end of the magnetic core 544.

Figure 7:
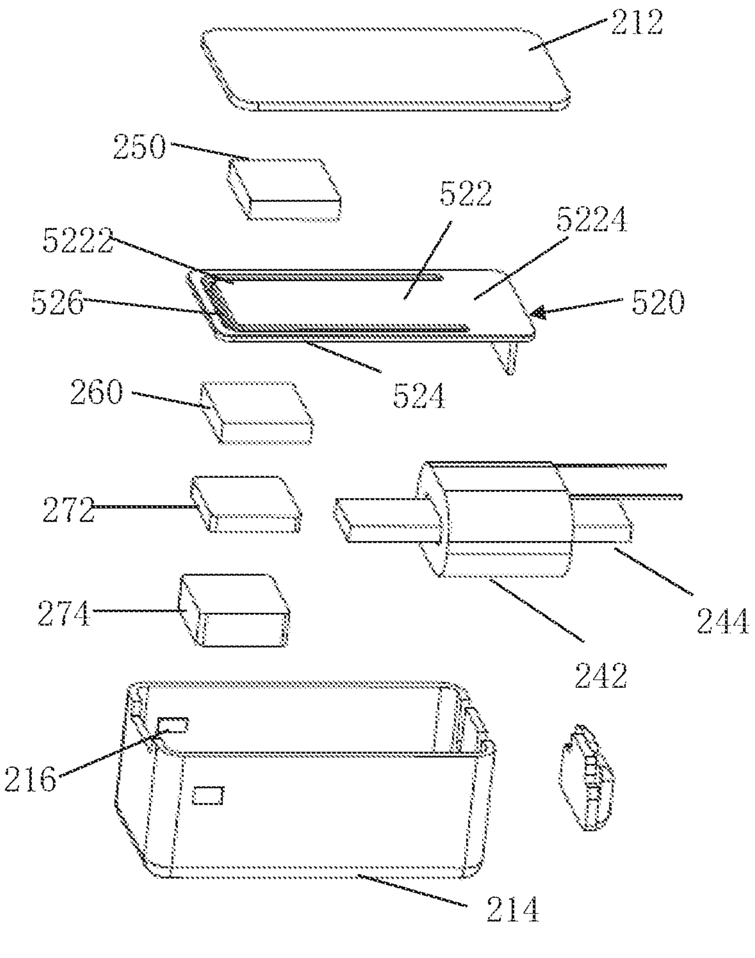
FIG. 7 is a schematic exploded view of the receiver shown in FIG. 5.

FIG. 7 is a schematic exploded view of the receiver shown in FIG. 5. Compared with FIG. 1, the assemblies inside the receiver shown in FIG. 7 are clearly structured, and the stacked design makes the assembly process simple, which is very suitable for automated production.

In summary, the vibration plate 222, 522 in the present invention are made of the magnetic permeable material, and the fixed end of the vibration plate is connected to the magnetic core of the coil assembly, so that the alternating current magnetic field generated by the coil after being energized enters the vibration plate and interacts with the DC magnetic field to generate a driving force to push the vibration plate to vibrate and produce sound without additional driving rods and reeds, and the vibration plate and the reed are combined into one. As a result, the receiver in the present invention has the following advantages or beneficial effects:

(1) The assemblies inside the receiver are clearly structured, and the stacked design makes the assembly process simple, which is very suitable for automated production;

(2) The connection between the movable parts (for example, the driving rod and the reed) is reduced, and the reliability is higher;

(3) Fewer component parts and simpler assembly process lead to higher production efficiency; and (4) Fewer components and simpler assembly process facilitate cost reduction.

In the present invention, unless otherwise specified, the terms such as “connection”, “connected”, “connecting”, “connect” and the like that indicate electrical connection indicate direct or indirect electrical connection.

It should be noted that any modifications made by a person skilled in the art to the specific implementations of the present invention shall fall within the scope of the claims of the present invention. Correspondingly, the scope of the claims of the present invention is not merely limited to the foregoing specific implementations.

The invention claimed is:

1. A receiver, comprising:

a housing having a hollow inner cavity;

a diaphragm mechanism disposed in the hollow inner cavity, partitioning the hollow inner cavity into a first cavity and a second cavity, and comprising a vibration plate comprising a free end being suspended in the hollow inner cavity and a fixed end;

an electromagnetic driving mechanism disposed in the hollow inner cavity and comprising a coil assembly and at least one magnetic field generation member, wherein each magnetic field generation member is disposed in the first cavity or the second cavity and is close to the free end of the vibration plate, the coil assembly is disposed in the second cavity and comprises a coil and a magnetic core, wherein the coil and the vibration plate are placed in the same direction, the magnetic core is inserted in a hollow inner hole of the coil, a first end of the magnetic core extends out of the hollow inner hole of the coil and is fixed in the second cavity, and a second end of the magnetic core extends out of the hollow inner hole of the coil and serves as a support at a fixed end of the vibration plate, the vibration plate is made of a magnetic permeable material, and wherein a periphery of the diaphragm mechanism is sealingly connected to an inner wall of the housing, wherein the electromagnetic driving mechanism further comprises a first magnetic permeable block and a second magnetic permeable block sequentially arranged between the second magnetic field generation member and a bottom surface of the housing, wherein the first magnetic permeable block and the second magnetic permeable block are arranged opposite to each other and are spaced apart from each other, the first end of the magnetic core extending out of the hollow inner hole of the coil is clamped between the first magnetic permeable block and the second magnetic permeable block, the magnetic core comprises a horizontal portion, wherein the horizontal portion of the magnetic core is inserted in the hollow inner hole of the coil, and is parallel to the vibration plate, and wherein the electromagnetic driving mechanism comprises:

a first magnetic field generation member, arranged within the first cavity, a first required gap being reserved between the first magnetic field generation member and the free end of the vibration plate; and a second magnetic field generation member, arranged within the second cavity, a second required gap being reserved between the first magnetic field generation member and the free end of the vibration plate, each of the first and the second required gap is 0.05-0.2 mm.

2. The receiver according to claim 1, wherein the magnetic field generation member is configured to generate a fixed magnetic field;

the coil assembly is configured to generate an alternating magnetic field after being energized;

and the alternating magnetic field generated by the coil assembly after being energized is introduced to the vibration plate.

3. The receiver according to claim 1, wherein the housing comprises a cover plate and a hollow box with a top opening, wherein the hollow box comprises a bottom surface and a side wall, the cover plate covers the top opening of the hollow box, and the hollow box and the cover plate form the hollow inner cavity, and the diaphragm mechanism is disposed within the hollow box and partitions the hollow inner cavity into the first cavity close to the cover plate and the second cavity close to the bottom surface of the hollow box.

4. The receiver according to claim 1, wherein the housing further comprises a boss arranged on an inner wall surface of the side wall of the housing, and the boss is configured to support the diaphragm mechanism.

5. The receiver according to claim 4, wherein a side of the diaphragm mechanism that is located at the free end of the vibration plate is supported by the boss; and a side of the diaphragm mechanism that is located at the fixed end of vibration plate is supported by the second end of the magnetic core.

6. The receiver according to claim 1, wherein the magnetic core is an L-shaped magnetic core, the L-shaped magnetic core further comprises a vertical portion wherein the vertical portion of the L-shaped magnetic core is connected to the fixed end of the vibration plate, and wherein one end of the horizontal portion of the L-shaped magnetic core is referred to as a first end of the L-shaped magnetic core, and the vertical portion of the L-shaped magnetic core is referred to as a second end of the L-shaped magnetic core.

7. The receiver according to claim 1, wherein the vibration plate is an inverted L-shaped vibration plate, the inverted L-shaped vibration plate comprises a horizontal portion and a vertical portion forming an inverted L-shaped structure, wherein one end of the horizontal portion of the inverted L-shaped vibration plate is a free end of the inverted L-shaped vibration plate, the other end of the horizontal portion that is connected to the vertical portion is a fixed end of the inverted L-shaped vibration plate, and the vertical portion of the inverted L-shaped vibration plate is connected to the second end of the magnetic core.

8. The receiver according to claim 6, wherein the second magnetic field generation member and the coil assembly are arranged side by side, and the coil assembly is closer to the fixed end of the vibration plate than the second magnetic field generation member.

9. The receiver according to claim 8, wherein the first magnetic field generation member is fixed to a top surface of the housing, and the first magnetic field generation member and the second magnetic field generation member are opposite to each other.

10. The receiver according to claim 7, wherein the second magnetic field generation member and the coil assembly are arranged side by side, and the coil assembly is closer to the fixed end of the vibration plate than the second magnetic field generation member.

11. The receiver according to claim 10, wherein the first magnetic field generation member is fixed to a top surface of the housing, and the first magnetic field generation member and the second magnetic field generation member are opposite to each other.

12. The receiver according to claim 1, wherein the diaphragm mechanism further comprises a fixed frame and a hinge, wherein the fixed frame is connected to the side wall of the housing and has an inner space formed through the fixed frame in a thickness direction of the fixed frame, and the hinge is configured to hinge the fixed end of the vibration plate to an inner side of the fixed frame and is disposed on the fixed frame, and a protrusion and a groove matching the hinge are respectively arranged on the fixed end of the vibration plate and the fixed frame.

* * * * *